United States Patent
Wagner et al.

(10) Patent No.: US 12,337,353 B2
(45) Date of Patent: *Jun. 24, 2025

(54) SYSTEMS AND METHODS FOR DYNAMIC SORTATION OF OBJECTS

(71) Applicant: Berkshire Grey Operating Company, Inc., Bedford, MA (US)

(72) Inventors: Thomas Wagner, Concord, MA (US); Kevin Ahearn, Nebo, NC (US); Benjamin Cohen, Somerville, MA (US); Michael Dawson-Haggerty, Pittsburgh, PA (US); Christopher Geyer, Arlington, MA (US); Thomas Koletschka, Cambridge, MA (US); Kyle Maroney, North Attleboro, MA (US); Matthew T. Mason, Pittsburgh, PA (US); Gene Temple Price, Cambridge, MA (US); Joseph Romano, Arlington, MA (US); Daniel Smith, Canonsburg, PA (US); Siddhartha Srinivasa, Seattle, WA (US); Prasanna Velagapudi, Pittsburgh, PA (US); Thomas Allen, Reading, MA (US)

(73) Assignee: Berkshire Grey Operating Company, Inc., Bedford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/377,417

(22) Filed: Oct. 6, 2023

(65) Prior Publication Data

US 2024/0033780 A1 Feb. 1, 2024

Related U.S. Application Data

(63) Continuation of application No. 17/828,314, filed on May 31, 2022, now Pat. No. 11,839,902, which is a
(Continued)

(51) Int. Cl.
  B07C 5/36 (2006.01)
  B07C 3/00 (2006.01)
  (Continued)

(52) U.S. Cl.
  CPC ............ B07C 5/36 (2013.01); B07C 3/008 (2013.01); B07C 3/02 (2013.01); B07C 3/082 (2013.01);
  (Continued)

(58) Field of Classification Search
  CPC ........... B07C 3/008; B07C 3/02; B07C 3/082; B07C 3/14; B07C 3/3412; B07C 5/36;
  (Continued)

(56) References Cited

U.S. PATENT DOCUMENTS

| 3,734,286 A | 5/1973 | Simjian |
| 4,186,836 A | 2/1980 | Wassmer et al. |

(Continued)

FOREIGN PATENT DOCUMENTS

| AU | 2006204622 A1 | 3/2007 |
| CA | 3007358 C | 1/2022 |

(Continued)

OTHER PUBLICATIONS

Extended European Search Report issued by the European Patent Office in related European Patent Application No. 23210520.5 on Feb. 12, 2024, 8 pages.
(Continued)

*Primary Examiner* — Michael McCullough
*Assistant Examiner* — Kalyanavenkateshware Kumar
(74) *Attorney, Agent, or Firm* — Gesmer Updegrove LLP

(57) ABSTRACT

An automated shuttle sorter is disclosed that includes a carriage that is movable from a load position at which the carriage may be loaded, and at least two destination loca-
(Continued)

tions into which any contents of the carriage may be provided from the carriage.

22 Claims, 11 Drawing Sheets

Related U.S. Application Data continuation of application No. 16/902,351, filed on Jun. 16, 2020, now Pat. No. 11,400,491, which is a continuation of application No. 15/241,779, filed on Aug. 19, 2016, now Pat. No. 10,730,078.

(60) Provisional application No. 62/265,181, filed on Dec. 9, 2015, provisional application No. 62/263,050, filed on Dec. 4, 2015.

(51) Int. Cl.
| | |
|---|---|
| *B07C 3/02* | (2006.01) |
| *B07C 3/08* | (2006.01) |
| *B07C 3/14* | (2006.01) |
| *B07C 5/34* | (2006.01) |
| *B65G 47/96* | (2006.01) |
| *G05B 19/418* | (2006.01) |
| *G06Q 10/087* | (2023.01) |

(52) U.S. Cl.
CPC .............. *B07C 3/14* (2013.01); *B07C 5/3412* (2013.01); *B65G 47/962* (2013.01); *G05B 19/4189* (2013.01); *G06Q 10/087* (2013.01); *B07C 2501/0063* (2013.01); *G05B 2219/32328* (2013.01); *G05B 2219/40078* (2013.01); *G05B 2219/45056* (2013.01); *Y02P 90/02* (2015.11)

(58) Field of Classification Search
CPC . B65G 47/962; G05B 19/4189; G06Q 10/087
See application file for complete search history.

(56) References Cited

U.S. PATENT DOCUMENTS

| | | | |
|---|---|---|---|
| 4,244,459 A | 1/1981 | Garrett | |
| 4,722,430 A | 2/1988 | Canziani | |
| 4,722,653 A | 2/1988 | Williams et al. | |
| 4,759,439 A | 7/1988 | Hartlepp | |
| 4,846,335 A | 7/1989 | Hartlepp | |
| 4,895,242 A | 1/1990 | Michel | |
| 4,989,719 A | 2/1991 | Ballestrazzi et al. | |
| 5,082,103 A | 1/1992 | Ross et al. | |
| 5,190,162 A | 3/1993 | Hartlepp | |
| 5,281,081 A | 1/1994 | Kato | |
| 5,419,457 A | 5/1995 | Ross et al. | |
| 5,794,788 A | 8/1998 | Massen | |
| 5,794,789 A | 8/1998 | Payson et al. | |
| 5,839,566 A | 11/1998 | Bonnet | |
| 5,875,434 A | 2/1999 | Matsuoka et al. | |
| 6,011,998 A | 1/2000 | Lichti et al. | |
| 6,059,092 A | 5/2000 | Jerue et al. | |
| 6,060,677 A | 5/2000 | Ulrichsen et al. | |
| 6,076,023 A | 6/2000 | Sato | |
| 6,079,570 A | 6/2000 | Oppliger et al. | |
| 6,131,372 A | 10/2000 | Pruett | |
| 6,208,908 B1 | 3/2001 | Boyd et al. | |
| 6,246,023 B1 | 6/2001 | Kugle | |
| 6,323,452 B1 | 11/2001 | Bonnet | |
| 6,390,756 B1 | 5/2002 | Isaacs et al. | |
| 6,401,936 B1 | 6/2002 | Isaacs et al. | |
| 6,505,093 B1 | 1/2003 | Thatcher et al. | |
| 6,579,053 B1 | 6/2003 | Grams et al. | |
| 6,685,031 B2 | 2/2004 | Takizawa | |
| 6,688,459 B1 | 2/2004 | Bonham et al. | |
| 6,762,382 B1 | 7/2004 | Danelski | |
| 6,897,395 B2 | 5/2005 | Shiibashi et al. | |
| 7,516,848 B1 | 4/2009 | Shakes et al. | |
| 7,728,244 B2 | 6/2010 | De Leo et al. | |
| 8,662,314 B2 | 3/2014 | Jones et al. | |
| 8,718,814 B1 | 5/2014 | Clark et al. | |
| 8,776,694 B2 | 7/2014 | Rosenwinkel et al. | |
| 8,811,722 B2 | 8/2014 | Perez Cortes et al. | |
| 8,952,284 B1 | 2/2015 | Wong et al. | |
| 8,972,049 B2 | 3/2015 | Tidhar et al. | |
| 9,102,336 B2 | 8/2015 | Rosenwinkel | |
| 9,120,622 B1 | 9/2015 | Elazary et al. | |
| 9,227,323 B1 | 1/2016 | Konolige et al. | |
| 9,346,083 B2 | 5/2016 | Stone | |
| 9,364,865 B2 | 6/2016 | Kim | |
| 9,481,518 B2 | 11/2016 | Neiser | |
| 9,486,926 B2 | 11/2016 | Kawano | |
| 9,492,923 B2 | 11/2016 | Wellman et al. | |
| 9,878,349 B2 | 1/2018 | Crest et al. | |
| 9,931,673 B2 | 4/2018 | Nice et al. | |
| 9,937,532 B2 | 4/2018 | Wagner et al. | |
| 10,625,305 B2 | 4/2020 | Wagner et al. | |
| 10,730,078 B2 | 8/2020 | Wagner et al. | |
| 11,400,491 B2 | 8/2022 | Wagner et al. | |
| 11,458,507 B2 | 10/2022 | Wagner et al. | |
| 2002/0092801 A1 | 7/2002 | Dominguez | |
| 2002/0157919 A1 | 10/2002 | Sherwin | |
| 2002/0169698 A1 | 11/2002 | Chien | |
| 2002/0179502 A1 | 12/2002 | Cerutti et al. | |
| 2003/0014376 A1 | 1/2003 | DeWitt et al. | |
| 2003/0034281 A1 | 2/2003 | Kumar | |
| 2003/0038065 A1 | 2/2003 | Pippin et al. | |
| 2003/0135300 A1 | 7/2003 | Lewis | |
| 2004/0065597 A1 | 4/2004 | Hanson | |
| 2004/0112712 A1 | 6/2004 | Brooks et al. | |
| 2004/0232056 A1 | 11/2004 | Groot et al. | |
| 2004/0261366 A1 | 12/2004 | Gillet et al. | |
| 2005/0167343 A1 | 8/2005 | Avishay | |
| 2005/0220600 A1 | 10/2005 | Baker et al. | |
| 2005/0274589 A1 | 12/2005 | Groot et al. | |
| 2006/0045672 A1 | 3/2006 | Maynard et al. | |
| 2006/0070929 A1 | 4/2006 | Fry | |
| 2006/0260908 A1 | 11/2006 | Affaticati | |
| 2007/0005179 A1 | 1/2007 | Mccrackin et al. | |
| 2007/0209976 A1 | 9/2007 | Worth et al. | |
| 2008/0181753 A1 | 7/2008 | Bastian et al. | |
| 2009/0218262 A1 | 9/2009 | Bowers et al. | |
| 2010/0122942 A1 | 5/2010 | Harres et al. | |
| 2010/0318216 A1 | 12/2010 | Faivre | |
| 2011/0144798 A1 | 6/2011 | Freudelsperger | |
| 2011/0238207 A1 | 9/2011 | Bastian, II et al. | |
| 2011/0243707 A1 | 10/2011 | Dumas et al. | |
| 2011/0320036 A1 | 12/2011 | Freudelsperger | |
| 2012/0118699 A1 | 5/2012 | Buchmann et al. | |
| 2012/0328397 A1 | 12/2012 | Yamashita | |
| 2013/0110280 A1 | 5/2013 | Folk | |
| 2013/0126304 A1 | 5/2013 | Stikkelorum | |
| 2013/0202195 A1 | 8/2013 | Perez Cortes et al. | |
| 2014/0061103 A1 | 3/2014 | Ito et al. | |
| 2014/0079524 A1 | 3/2014 | Shimono et al. | |
| 2014/0142746 A1 | 5/2014 | Vegh et al. | |
| 2014/0244026 A1 | 8/2014 | Neiser | |
| 2014/0262687 A1 | 9/2014 | Kilper | |
| 2014/0291112 A1 | 10/2014 | Lyon et al. | |
| 2014/0305847 A1 | 10/2014 | Kudrus | |
| 2014/0360924 A1 | 12/2014 | Smith et al. | |
| 2015/0057793 A1 | 2/2015 | Kawano | |
| 2015/0073589 A1 | 3/2015 | Khodl et al. | |
| 2015/0081090 A1 | 3/2015 | Dong | |
| 2015/0283586 A1 | 10/2015 | Dante et al. | |
| 2015/0306634 A1 | 10/2015 | Maeda et al. | |
| 2015/0375398 A1 | 12/2015 | Penn et al. | |
| 2016/0096694 A1 | 4/2016 | Baylor et al. | |
| 2016/0199884 A1 | 7/2016 | Lykkegaard et al. | |
| 2016/0221762 A1 | 8/2016 | Schroader | |
| 2016/0228921 A1 | 8/2016 | Doublet et al. | |
| 2016/0244262 A1 | 8/2016 | O'Brien et al. | |
| 2016/0347545 A1 | 12/2016 | Lindbo et al. | |
| 2017/0043953 A1 | 2/2017 | Battles et al. | |
| 2017/0066597 A1 | 3/2017 | Hiroi | |

(56) References Cited

U.S. PATENT DOCUMENTS

| | | | |
|---|---|---|---|
| 2017/0080566 | A1 | 3/2017 | Stubbs et al. |
| 2017/0106532 | A1 | 4/2017 | Wellman et al. |
| 2017/0157648 | A1 | 6/2017 | Wagner et al. |
| 2017/0320102 | A1 | 11/2017 | McVaugh et al. |
| 2020/0215577 | A1 | 7/2020 | Wagner et al. |
| 2021/0122054 | A1 | 4/2021 | Sun et al. |
| 2021/0122586 | A1 | 4/2021 | Sun et al. |
| 2022/0288644 | A1 | 9/2022 | Wagner et al. |
| 2022/0348409 | A1 | 11/2022 | Sun et al. |
| 2022/0371053 | A1 | 11/2022 | Wagner et al. |
| 2023/0077893 | A1 | 3/2023 | Gedhardt et al. |
| 2023/0219767 | A1 | 7/2023 | Demir et al. |
| 2025/0001457 | A1 | 1/2025 | Wagner et al. |

FOREIGN PATENT DOCUMENTS

| | | | |
|---|---|---|---|
| CN | 1033604 | A | 7/1989 |
| CN | 2210723 | Y | 10/1995 |
| CN | 2513958 | Y | 10/2002 |
| CN | 101808916 | A | 8/2010 |
| CN | 102112380 | A | 6/2011 |
| CN | 102205907 | A | 10/2011 |
| CN | 102390701 | A | 3/2012 |
| CN | 102849423 | A | 1/2013 |
| CN | 103143510 | A | 6/2013 |
| CN | 103318653 | A | 9/2013 |
| CN | 103387120 | A | 11/2013 |
| CN | 104444299 | A | 3/2015 |
| CN | 104858150 | A | 3/2015 |
| CN | 204724475 | U | 10/2015 |
| CN | 105035677 | A | 11/2015 |
| CN | 108602630 | A | 9/2018 |
| CN | 113926740 | A | 1/2022 |
| DE | 19510392 | A1 | 9/1996 |
| DE | 102004001181 | A1 | 8/2005 |
| DE | 102004013353 | A1 | 10/2005 |
| DE | 102005016309 | A1 | 7/2007 |
| DE | 102005061309 | A1 | 7/2007 |
| DE | 102007023909 | A1 | 11/2008 |
| DE | 102007038834 | A1 | 2/2009 |
| DE | 102010002317 | A1 | 8/2011 |
| DE | 102012102333 | A1 | 9/2013 |
| DE | 102014111396 | A1 | 2/2016 |
| EP | 0613841 | A1 | 9/1994 |
| EP | 1695927 | A2 | 8/2006 |
| EP | 1995192 | A2 | 11/2008 |
| EP | 2233400 | A1 | 9/2010 |
| EP | 2511653 | A1 | 10/2012 |
| EP | 2650237 | A1 | 10/2013 |
| EP | 2823899 | A1 | 1/2015 |
| EP | 3006379 | A2 | 4/2016 |
| EP | 3383773 | B1 | 1/2024 |
| FR | 1457450 | A | 1/1966 |
| FR | 2832654 | A1 | 5/2003 |
| GB | 2084531 | A | 4/1982 |
| GB | 2507707 | A | 5/2014 |
| JP | S54131278 | A | 10/1979 |
| JP | S63310406 | A | 12/1988 |
| JP | 2002028577 | A | 1/2002 |
| JP | 2007182286 | A | 7/2007 |
| JP | 2008037567 | A | 2/2008 |
| JP | 2014141313 | A | 8/2014 |
| WO | 9523750 | A1 | 9/1995 |
| WO | 2005022076 | A2 | 3/2005 |
| WO | 2007009136 | A1 | 1/2007 |
| WO | 2008091733 | A2 | 7/2008 |
| WO | 2010017872 | A1 | 2/2010 |
| WO | 2010046809 | A1 | 4/2010 |
| WO | 2010099873 | A1 | 9/2010 |
| WO | 2011038442 | A2 | 4/2011 |
| WO | 2012024714 | A2 | 3/2012 |
| WO | 2016100235 | A1 | 6/2016 |
| WO | 2017096021 | A1 | 6/2017 |
| WO | 2017150006 | A1 | 9/2017 |

OTHER PUBLICATIONS

Chen, Modern Logistics Engineering Technology and System Equipment, China Railway Publishing House, Jun. 2010, pp. 190, along with the English translation prepared by Shanghai Patent & Trademark Law Office, LLC on Dec. 6, 2023, 2 pages.

Communication pursuant to Article 94(3) EPC issued by the European Patent Office in related European Patent Application No. 16816518.1 on Oct. 24, 2019, 5 pages.

Communication pursuant to Article 94(3) EPC issued by the European Patent Office in related European Patent Application No. 16816518.1 on Jul. 30, 2020, 5 pages.

Communication pursuant to Article 94(3) EPC issued by the European Patent Office in related European Patent Application No. 16816518.1 on Aug. 11, 2021, 4 pages.

Communication pursuant to Article 94(3) EPC issued by the European Patent Office in related European Patent Application No. 16816518.1 on Feb. 10, 2022, 4 pages.

Decision on Rejection, and its English Translation, issued by the China National Intellectual Property Administration in related Chinese Patent Application No. 201680080909.X on Jun. 2, 2021, 22 pages.

European Search Report, along with the transmittal, issued by the European Patent Office, in related European Patent Application No. 20204823.7 on Feb. 4, 2021, 12 pages.

Examiner's Report issued by Innovation, Science and Economic Development Canada (Canadian Intellectual Property Office) in related Canadian Patent Application No. 3,007,359 on Nov. 4, 2021, 3 pages.

Examiner's Report issued by the Innovation, Science and Economic Development Canada (Canadian Intellectual Property Office) in related Canadian Patent Application No. 3,139,152 on Jan. 31, 2023, 5 pages.

Examiner's Report issued by the Innovation, Science and Economic Development Canada (Canadian Intellectual Property Office) in related Canadian Patent Application No. 3,139,152 on Aug. 29, 2023, 3 pages.

Final Office Action issued by the U.S. Patent and Trademark Office in related U.S. Appl. No. 15/367,793 on Dec. 7, 2018, 27 pages.

Final Office Action issued by the U.S. Patent and Trademark Office in related U.S. Appl. No. 15/241,779 on Sep. 27, 2018, 10 pages.

Final Office Action issued by the U.S. Patent and Trademark Office in related U.S. Appl. No. 15/241,779 on Dec. 27, 2019, 11 pages.

First Office Action, and its English Translation, issued by the State Intellectual Property Office of the People's Republic of China, in related Chinese Patent Application No. 201680080909.X on Jun. 11, 2020, 27 pages.

International Preliminary Report on Patentability issued by the International Bureau of WIPO on Jun. 5, 2018, in related International Application No. PCT/US2016/064587, 13 pages.

International Preliminary Report on Patentability issued by the International Bureau of WIPO on Jun. 5, 2018, in related International Application No. PCT/US2016/064389, 7 pages.

International Search Report and Written Opinion issued by the International Searching Authority, the European Patent Office, on Apr. 5, 2017 in related International Application No. PCT/US22016/064587, 16 pages.

International Search Report and Written Opinion issued by the International Searching Authority, the European Patent Office, on Mar. 16, 2017 in related International Application No. PCT/US22016/064389, 11 pages.

Non-Final Office Action issued by the U.S. Patent and Trademark Office in related U.S. Appl. No. 15/367,793 on Feb. 28, 2018, 24 pages.

Non-Final Office Action issued by the U.S. Patent and Trademark Office in related U.S. Appl. No. 15/367,793 on May 28, 2019, 32 pages.

Non-Final Office Action issued by the U.S. Patent and Trademark Office in related U.S. Appl. No. 15/241,779 on Dec. 12, 2017, 8 pages.

(56) References Cited

OTHER PUBLICATIONS

Non-Final Office Action issued by the U.S. Patent and Trademark Office in related U.S. Appl. No. 15/241,779 on Mar. 29, 2019, 9 pages.
Non-Final Office Action issued by the U.S. Patent and Trademark Office in related U.S. Appl. No. 16/902,351 on Oct. 4, 2021, 18 pages.
Non-Final Office Action issued by the U.S. Patent and Trademark Office in related U.S. Appl. No. 16/804,326 on Mar. 2, 2022, 14 pages.
Non-Final Office Action issued by the United States Patent and Trademark Office in related U.S. Appl. No. 17/828,314 issued on Nov. 25, 2022, 19 pages.
Non-Final Office Action issued by the United States Patent and Trademark Office in related U.S. Appl. No. 17/852,002 on Dec. 7, 2023, 16 pages.
Notice on the First Office Action issued by the China National Intellectual Property Administration in related Chinese Patent Application No. 202111263597.5 on Mar. 30, 2023, 30 pages.
Notice on the Fourth Office Action, and its English Translation, issued by the China National Intellectual Property Administration in related Chinese Patent Application No. 201680080930.X on May 8, 2021, 10 pages.
Notice on the Second Office Action issued by the China National Intellectual Property Administration in related Chinese Patent Application No. 202111263597.5 on Oct. 13, 2023, 25 pages.
Notice on the Third Office Action and the Third Office Action, along with its English translation, issued by the China National Intellectual Property Administration in related Chinese Patent Application No. 201680080930.X on Jan. 6, 2021, 10 pages.
Office Action issued by Innovation, Science and Economic Development Canada in related Canadian Patent Application No. 3,007,358 on May 15, 2019, 5 pages.
Office Action issued by Innovation, Science and Economic Development Canada in related Canadian Patent Application No. 3,007,359 on Apr. 17, 2019, 4 pages.
Office Action issued by Innovation, Science and Economic Development Canada in related Canadian Patent Application No. 3,007,358 on Jan. 17, 2020, 3 pages.
Office Action issued by Innovation, Science and Economic Development Canada in related Canadian Patent Application No. 3,007,359 on Mar. 10, 2020, 3 pages.
Office Action issued by Innovation, Science and Economic Development Canada in related Canadian Patent Application No. 3,007,358 on Oct. 2, 2020, 5 pages.
Office Action issued by Innovation, Science and Economic Development Canada in related Canadian Patent Application No. 3,007,359 on Dec. 24, 2020, 3 pages.
Office Action, and its English Translation, issued by the State Intellectual Property Office of the People's Republic of China, in related Chinese Patent Application No. 20160080930.X on Jul. 10, 2019, 23 pages.
Rules 161(1) and 162 EPC issued by the European Patent Office on Jul. 11, 2018 in related European Patent Application No. 16822292.5, 3 pages.
Rules 161(1) and 162 EPC issued by the European Patent Office on Aug. 10, 2018 in related European Patent Application No. 16816518.1, 3 pages.
Second Office Action, and its English Translation, issued by the State Intellectual Property Office of the People's Republic of China, in related Chinese Patent Application No. 20160080930.X on May 13, 2020, 13 pages.
Second Office Action, and its English Translation, issued by the China National Intellectual Property Administration in related Chinese Patent Application No. 201680080909.X on Jan. 8, 2021, 28 pages.
U.S. Appl. No. 62/269,640 filed with the U.S. Patent and Trademark Office on Dec. 18, 2015, 36 pages.
Examiner's report issued by the Innovation, Science and Economic Development Canada (Canadian Intellectual Property Office) issued in related Canadian Patent Application No. 3,186,455 on May 17, 2024, 3 pages.
Decision on Rejection, along with its English translation, issued by the China National Intellectual Property Administration in related Chinese Patent Application No. 202111263597.5 on Apr. 24, 2024, 19 pages.
Examiner's Report issued by the Innovation, Science and Economic Development Canada (Canadian Intellectual Property Office) in related Canadian Patent Application No. 3,178,222 on Apr. 17, 2024, 4 pages.

SYSTEMS AND METHODS FOR DYNAMIC SORTATION OF OBJECTS

PRIORITY

The present application is a continuation of U.S. patent application Ser. No. 17/828,314, filed May 31, 2022; which is a continuation of U.S. patent application Ser. No. 16/902,351, filed Jun. 16, 2020, now U.S. Pat. No. 11,400,491, issued Aug. 2, 2022; which is a continuation of U.S. patent application Ser. No. 15/241,779, filed Aug. 19, 2016, now U.S. Pat. No. 10,730,078 issued Aug. 4, 2020, which claims priority to U.S. Provisional Patent Application Ser. No. 62/263,050, filed Dec. 4, 2015, as well as U.S. Provisional Patent Application Ser. No. 62/265,181, filed Dec. 9, 2015, the entire disclosures of which are-hereby incorporated by reference in their entireties.

BACKGROUND

The invention generally relates to sortation systems, and relates in particular to robotic and other sortation systems for sorting objects, where the sortation systems are intended to be used in dynamic environments requiring the systems to accommodate the processing of a variety of objects.

Current distribution center sorting systems, for example, generally assume an inflexible sequence of operations whereby a disorganized stream of input objects is first singulated into a single stream of isolated objects presented one at a time to a scanner that identifies the object. An induction element (e.g., a conveyor, a tilt tray, or manually movable bins) transport the objects to the desired destination or further processing station, which may be a bin, a chute, a bag or a conveyor etc.

In typical parcel sortation systems, human workers or automated systems typically retrieve parcels in an arrival order, and sort each parcel or object into a collection bin based on a set of given heuristics. For instance, all objects of like type might go to a collection bin, or all objects in a single customer order, or all objects destined for the same shipping destination, etc. The human workers or automated systems are required to receive objects and to move each to their assigned collection bin. If the number of different types of input (received) objects is large, a large number of collection bins is required.

Such a system has inherent inefficiencies as well as inflexibilities since the desired goal is to match incoming objects to assigned collection bins. Such systems may require a large number of collection bins (and therefore a large amount of physical space, large capital costs, and large operating costs) in part, because sorting all objects to all destinations at once is not always most efficient.

In short, when automating sortation of objects, there are a few main things to consider: 1) the overall system throughput (parcels sorted per hour), 2) the number of diverts (i.e., number of discrete locations to which an object can be routed), 3) the total area of sortation system (square feet), and 4) the annual costs to run the system (man-hours, electrical costs, cost of disposable components).

Current state-of-the-art sortation systems rely on human labor to some extent. Most solutions rely on a worker that is performing sortation, by scanning an object from an induction area (chute, table, etc.) and placing the object in a staging location, conveyor, or collection bin. When a bin is full or the controlling software system decides that it needs to be emptied, another worker empties the bin into a bag, box, or other container, and sends that container on to the next processing step. Such a system has limits on throughput (i.e., how fast can human workers sort to or empty bins in this fashion) and on number of diverts (i.e., for a given bin size, only so many bins may be arranged to be within efficient reach of human workers).

Other partially automated sortation systems involve the use of recirculating conveyors and tilt trays, where the tilt trays receive objects by human sortation, and each tilt tray moves past a scanner. Each object is then scanned and moved to a pre-defined location assigned to the object. The tray then tilts to drop the object into the location. Further partially automated systems, such as the bomb-bay style recirculating conveyor, involve having trays open doors on the bottom of each tray at the time that the tray is positioned over a predefined chute, and the object is then dropped from the tray into the chute. Again, the objects are scanned while in the tray, which assumes that any identifying code is visible to the scanner.

Such partially automated systems are lacking in key areas. As noted, these conveyors have discrete trays that can be loaded with an object; they then pass through scan tunnels that scan the object and associate it with the tray in which it is riding. When the tray passes the correct bin, a trigger mechanism causes the tray to dump the object into the bin. A drawback with such systems however, is that every divert requires an actuator, which increases the mechanical complexity and the cost per divert can be very high.

An alternative is to use human labor to increase the number of diverts, or collection bins, available in the system. This decreases system installation costs, but increases the operating costs. Multiple cells may then work in parallel, effectively multiplying throughput linearly while keeping the number of expensive automated diverts at a minimum. Such diverts do not ID an object and cannot divert it to a particular spot, but rather they work with beam breaks or other sensors to seek to ensure that indiscriminate bunches of objects get appropriately diverted. The lower cost of such diverts coupled with the low number of diverts keep the overall system divert cost low.

Unfortunately, these systems don't address the limitations to total number of system bins. The system is simply diverting an equal share of the total objects to each parallel manual cell. Thus each parallel sortation cell must have all the same collection bins designations; otherwise an object might be delivered to a cell that does not have a bin to which that object is mapped.

There remains a need for a more efficient and more cost effective object sortation system that sorts objects of a variety of sizes and weights into appropriate collection bins or trays of fixed sizes, yet is efficient in handling objects of such varying sizes and weights.

SUMMARY

In accordance with an embodiment, the invention provides an automated shuttle sorter that includes a carriage that is movable from a load position at which the carriage may be loaded, and at least two destination locations into which any contents of the carriage may be provided from the carriage.

In accordance with another embodiment, the invention provides a sortation system that includes an automated carriage for receiving an object at a load station from an object identification system. The automated carriage includes an automated transport system for reciprocally moving between at least two destination stations, and a transfer system for transferring the object from the automated carriage into one of the at least two destination stations.

In accordance with a further embodiment, the invention provides a method of sorting objects. The method includes the steps of acquiring an object to be sorted from an input station, identifying the object, providing the object to an automated carriage that is reciprocally movable between at least two destination stations, and moving the object to one of the at least two destination stations.

BRIEF DESCRIPTION OF THE DRAWINGS

The following description may be further understood with reference to the accompanying drawings in which.

The drawings are shown for illustrative purposes only.

DETAILED DESCRIPTION

In accordance with various embodiments, the invention provides an inherently more flexible object sortation system in which objects may be selected in a most advantageous order, and the sortation of those objects may take advantage of dynamically varying correspondence between the sorter outputs and the ultimate object destinations. The invention further provides a highly efficient and readily scalable system for providing the transport and distribution of objects.

Systems and methods of the present invention are well suited to applications in current sortation systems that receive objects in a disorganized stream and are required to sort the objects into sorted streams. Such systems recognize that reading information on an object may sometimes be challenging, so that once an object is scanned, it is important to keep the information associated with the object. The acquisition of objects from disorganized jumbles is challenging, and once an object is acquired, it is important to keep the object separated from other objects. Further, the transport and conveying systems have limited flexibility, typically following a single track that passes every possible destination.

In accordance with certain embodiments, the invention provides systems and methods that upend basic assumptions of current sortation systems, with improvements in each of the challenges identified above. The systems, in some embodiments, provide improved transport and distribution, and further provide for the identification of the entire object's shape and disposition, reducing or eliminating the need to keep the object separate from others. The use of robotic manipulators improves the reliability and economy of acquiring objects, even when in a jumble with other objects, reducing the need to maintain separation of objects. The systems, in further embodiments, provide improved transport and conveyor systems, and provide learning algorithms in particular, that allow dynamically changing patterns of object handling, with resulting efficiencies in the sortation process, lower space requirements, lower demand for manual operations, and as a consequence, lower capital and operating costs for the entire system.

Figure 1:
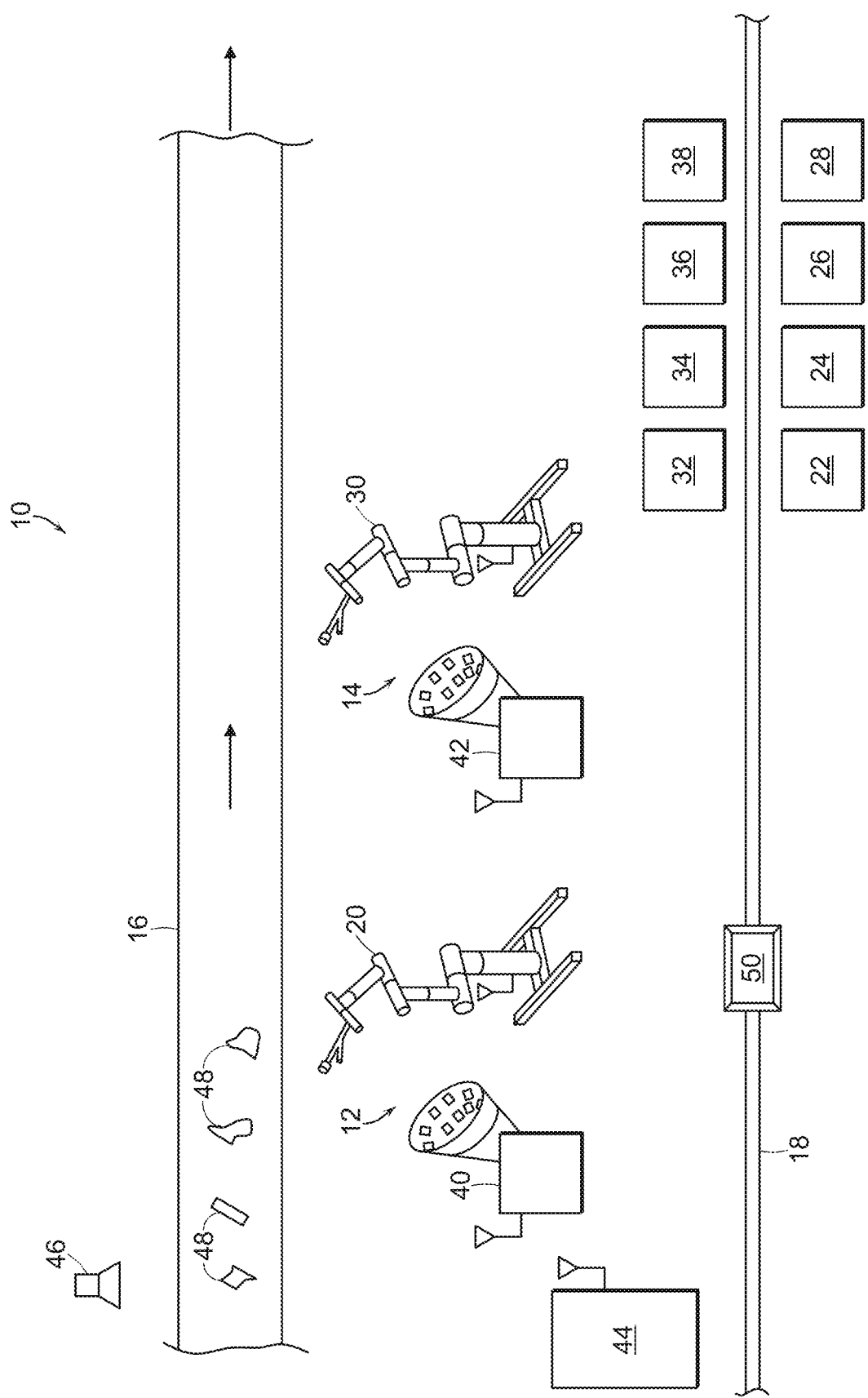
FIG. 1 shows an illustrative diagrammatic view of a sortation system in accordance with an embodiment of the invention.

FIG. 1, for example, shows a system 10 in accordance with an embodiment of the present invention that includes a sorting station 12 that is fed by a common input conveyor 16. An output track 18 carries an output carriage 50 to bins 22, 24, 26, 28, 32, 34, 36 and 38. The carriage 50 brings items to a dynamically assigned bin. The sorting station 12 may also include a scanner 40 that permits an object to be scanned while being held by an end effector of a robotic system 20. A central controller 44 communicates with the robotic system 20 and scanner 40 to provide input regarding the assignment of objects to a bin as discussed in more detail below. An additional scanner 46 may be employed to provide the sorting stations with advance information regarding objects 48 that are being provided on the input conveyor 16. The system may also include further sorting stations, e.g., 14, that may also include a scanner 42 that permits an object to be scanned while being held by an end effector of a robotic system 30. A central controller 44 communicates with the robotic system 30 and scanner 42 to provide input regarding the assignment of objects to a bin as discussed in more detail below.

During use, each sorting station 12, 14 may either select an object and then identify the selected object by a detection device on the articulated arm, or may use the articulated arm to hold the object in front of a scanner, or may place the object into a scanner as discussed below, or may first identify an object prior to selection, and then grasp the identified object. In any event, the system then assigns a bin to the object if a new bin is available and the object is not yet assigned a bin at that sorting station. What is significant is that the sorting station is not pre-assigned a large set of collection bins assigned to all possible objects that may appear in the input path. Further, the central controller may employ a wide variety of heuristics that may further shape the process of dynamically assigning objects to collection bins as discussed in more detail below. The input conveyor may be also provided as a loop conveyor on which objects pass by multiple sorting stations, or the input conveyor may be provided as multiple conveyors on which objects pass by multiple sorting stations. The invention provides, therefore, examples of sortation systems that involve moving infeed objects directly to a buffer, without human intervention. The buffer holds the objects, possibly in a disorganized jumble, where they may be accessed by one of several sorters. The perception system may read labels when they are visible, but may also use more general machine vision algorithms to identify object class and shape, and to track objects as they are circulated. The sorters acquire objects from the buffer. If needed, they use their own perception systems to read labels not previously read. They may move objects to any of several outputs, including the possibility of placing an object back on the buffer, either for later handling or for handling by a different sorter.

Systems of various embodiments provide numerous advantages because of the inherent dynamic flexibility. The flexible correspondence between sorter outputs and destinations provides that there may be fewer sorter outputs than destinations, so the entire system may require less space. The flexible correspondence between sorter outputs and destinations also provides that the system may choose the most efficient order in which to handle objects, in a way that varies with the particular mix of objects and downstream demand. The system is also easily scalable, by adding sorters, and more robust since the failure of a single sorter might be handled dynamically without even stopping the system. It should be possible for sorters to exercise discretion in the order of objects, favoring objects that need to be handled quickly, or favoring objects for which the given sorter may have a specialized gripper.

The system may also employ a flexible destination stage, including a process for dynamically changing the correspondence of sorter outputs and system destinations using a switch based on heuristics from the sortation process. The system may dynamically map sorter outputs to system destinations based on long-term historical usage trends and statistics, or items already processed, or current contents of other dynamically allocated sorter outputs, or average, minimum or maximum time-to-sort associated with each sorter output, or physical characteristics of the items sorted, or apriori information, or known future deliveries, or location within a facility, including the physical location relative to other allocated sorter outputs (e.g., above, beside, on or nearby), or incoming shipments, as well as knowing what items are currently upstream of the sortation process and combinations of the above. Further, systems of embodiments of the invention provide that information regarding correspondence between sorter outputs to system destinations may be provided to an automated system for sorting.

By making use of heuristics, the mapping of sorter outputs to system destinations can be improved substantially over traditional fixed allocation. Destinations may be assigned on the fly, reducing wasted space from unused sorter outputs and decreasing the time it takes to process incoming objects. Long-term historic trends may be used to allocate sorter outputs when the next incoming group of objects is either in-part or entirely unknown. Historical usage patterns provide insight into when objects bound for certain destinations can be expected to arrive, the number of objects bound for each destination expected for any given time, and the probable physical properties of these incoming objects.

In addition to trends pertaining to incoming objects, historical trends provide information on the speed at which objects can be sorted into outputs, and the rate at which outputs are transferred to system destinations. These factors allow sorter outputs to be allocated probabilistically until a deterministic understanding of incoming objects is achieved.

In addition to historic trends, an understanding of the current state of the system is used to ensure that there is an appropriate amount of space allocated for those objects that are expected to arrive. When combined with the knowledge of those objects that have already been sorted, the correspondence of sorter outputs to system destinations can typically be allocated deterministically. A knowledge of those objects already processed and the contents of current sorter outputs allows the system to optionally remap the sorter outputs once they have been emptied of their contents. In the case that there aren't enough sorter outputs, this knowledge also allows the system to specify which sorter outputs should be emptied such that they can quickly be reallocated to new system destinations.

A further consideration when dynamically allocating sorter outputs is to take into account the physical characteristics of the packages and the facility. If a certain destination is expected to receive larger, unwieldy objects, then an appropriately-sized sorter output can be allocated. If a particular system destination will require more than a single sorter output, then two adjacent outputs can be allocated with the same destination in order to facilitate human intervention.

A method is also presented for displaying the sorter output—system destination correspondence information next to the destinations. This allows human workers interacting with the system to understand how and when to properly empty the destinations. In addition, critical to autonomous sortation is the ability to send these destination allocations to a sortation system without human intervention. This allows for the construction of fully-streamlined sortation system software.

Figure 2:
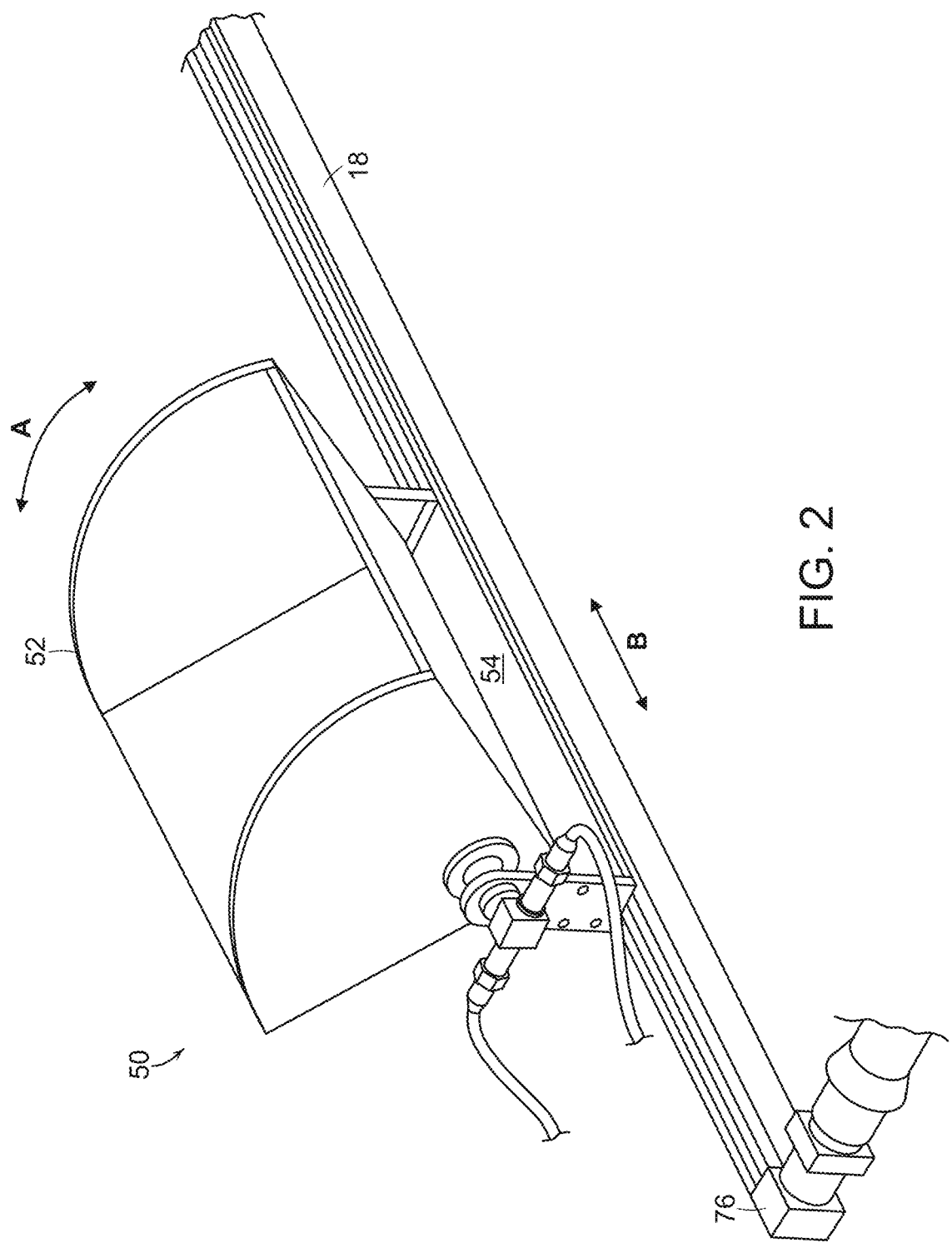
FIG. 2 shows an illustrative diagrammatic view of a carriage for use in the sortation system of FIG. 1.

The carriage system for placement at destination locations is also efficient and scalable. As shown in FIG. 2, for example, the carriage 50 includes a load bed 52 that is pivotally mounted on a carrier 54 (as generally indicated at A). The carrier 54 is slidably mounted on the track 18 (as generally indicated at B). The movement of the carriage may be provided by any of a variety of power sources, such as electric charge via an electric track, or by pneumatics or a belt drive that drive the carriage along the track in both directions with good speed and accuracy. Similarly, the tipping of the carriage may be provided by any of a variety of power sources such as electric charge (e.g., using reverse direction solenoids), or by pneumatics that tip the carriage in either direction (transverse to the direction of the track) as desired.

Figure 3A:
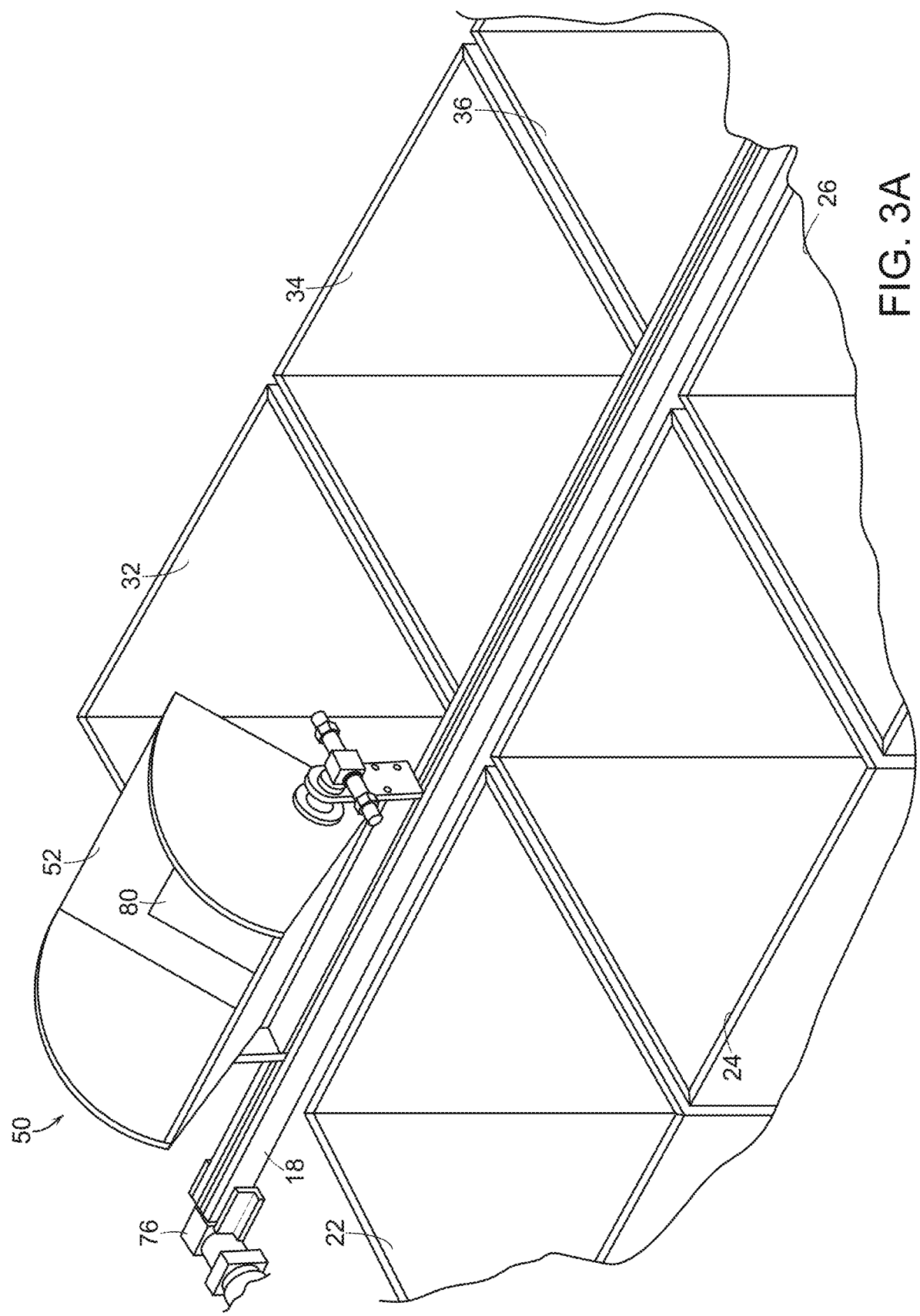
FIGS. 3A-3C show illustrative diagrammatic views of the carriage of FIG. 2 at different stages of movement.
Figure 3B:
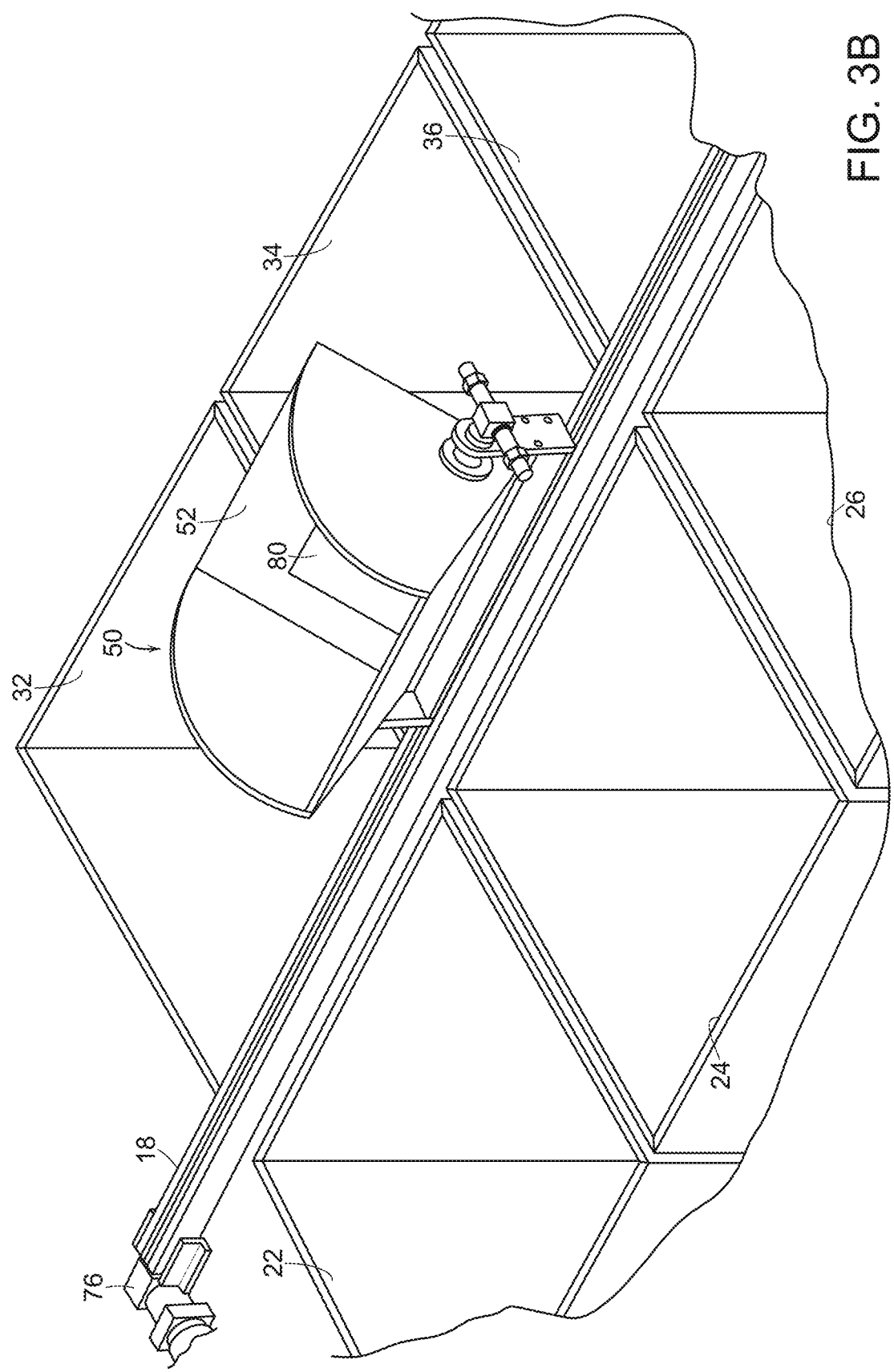
Figure 3C:
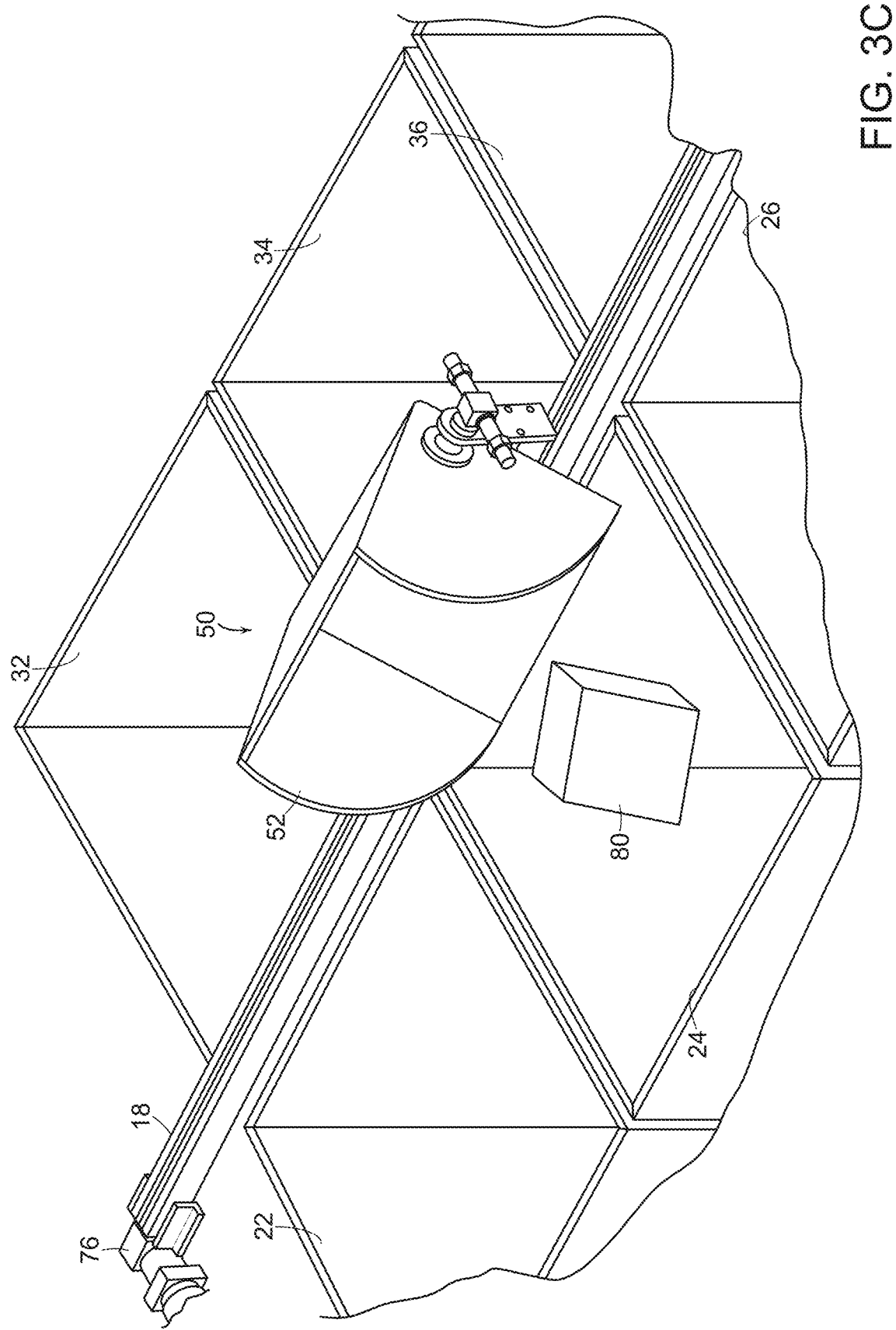

For example, FIGS. 3A-3C show the carriage 50 conveying an object 80 within the load bed 52 of the carriage 50 from a first location (FIG. 3A) to a destination location (FIG. 3B), whereupon the load bed 52 is tipped (FIG. 3C), causing the object 80 to fall into the a desired destination location 24 among a plurality of other destination locations 22, 26, 32, 34, 36.

In accordance with certain embodiments therefore, systems of the invention may employ carriages that shuttle back and forth along shuttle directions. Such systems may rely on apre-sortation step, where an object is sorted first to the correct sortation station, and once there, it is sorted into the proper collection bin. In this fashion, different stations can have different collection bin mappings, allowing the total number of system bins to be multiplied by the number of parallel sortation stations operating. Such pre-sortation steps however, must be either complicated and expensive automated systems, or must rely on yet more human work; either way adds cost which raises the overall cost per divert of the system to unacceptably high levels. The invention provides a new approach to object sortation that yields a large (and very flexible and scalable) number of total collection bins, very low divert costs per bin, throughput as high as that of a manual system, and a far smaller need for manual labor to operate.

Figure 4:
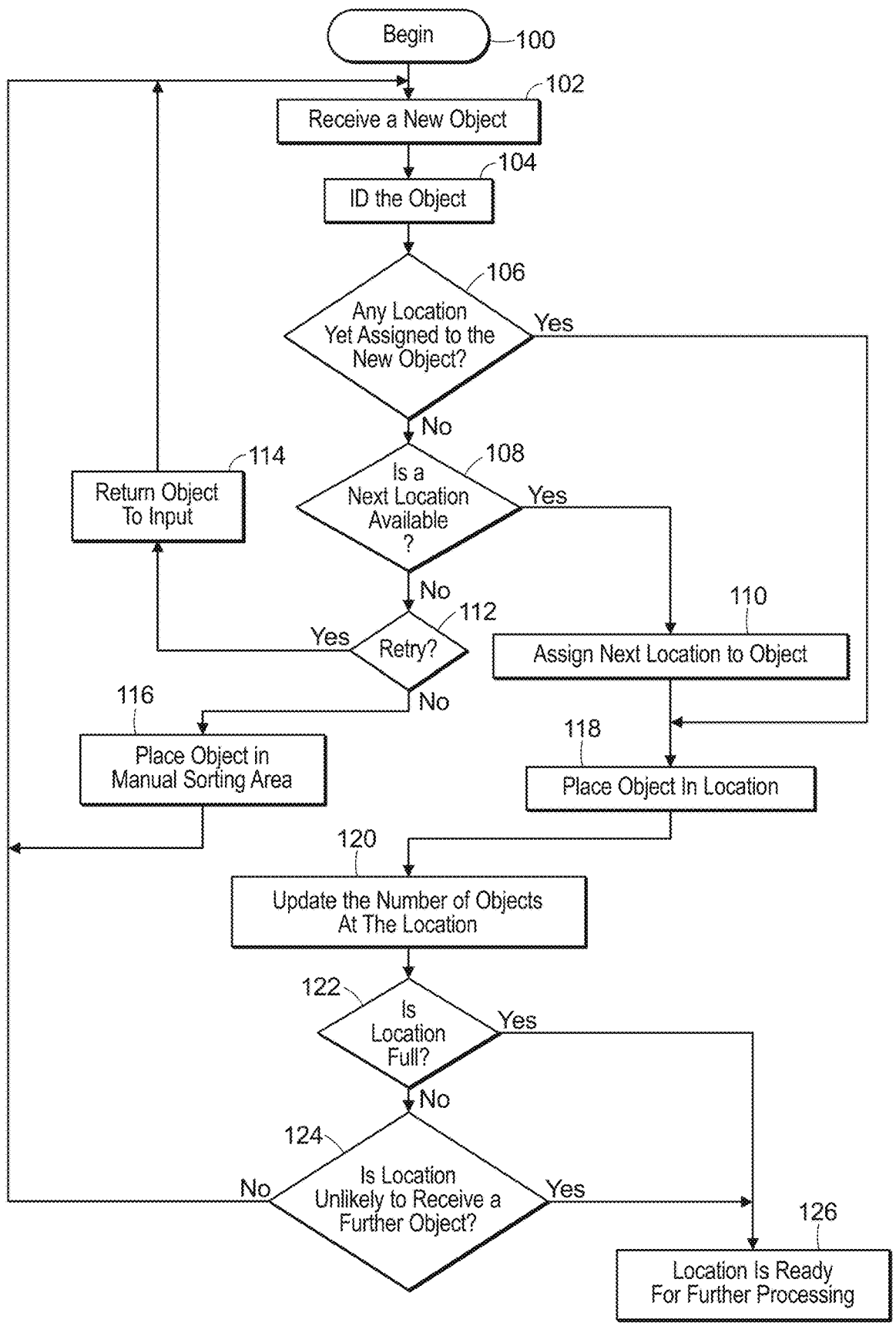
FIG. 4 shows an illustrative flowchart showing processing steps during operation of a system in accordance with an embodiment of the invention.

FIG. 4 shows a flowchart of the operation of a system in accordance with an embodiment of the present invention. The process begins (step 100) and the articulated arm, or another object reception device, receives a new object (step 102). The system then identifies the new object (step 104) by any of an overhead scanner 46, or a scanner system 40, 42, or by a drop scanner as discussed below, etc. The system then determines whether any location at the station has yet been assigned to the new object (step 106). If so, the system then places the object at that location (step 118). If not, the system then determines whether a next location is available (Step 108). If not, the system may (either with or without input from a human) determine whether to retry identifying the object (step 112). If so, then the system would return the object to the input stream (step 114) to be again received at a later time (step 102). If not, the system would place the object in a manual sorting area for sortation by a human (step 116). If a next location is available (step 108), the system then assigns a next location to the object (step 110), and the object is then placed in that location (step 118). If a location had already been assigned to the object (step 106), then the system the object is placed in that location (step 118). The number of objects at the location is then updated (step 120), and if the location is then full (step 122), the system identifies that the location is ready for further processing (step 126). If not, the system then determines whether (based on prior knowledge and/or heuristics), whether the location is likely to receive a further object (step 124). If so, the system identifies that the location is ready for further processing (step 126). If not, the system returns to receiving a new object (step 102). The further processing may, for example include collecting the items at the location in a single bag for transport to shipping to a geographic area.

Figure 5:
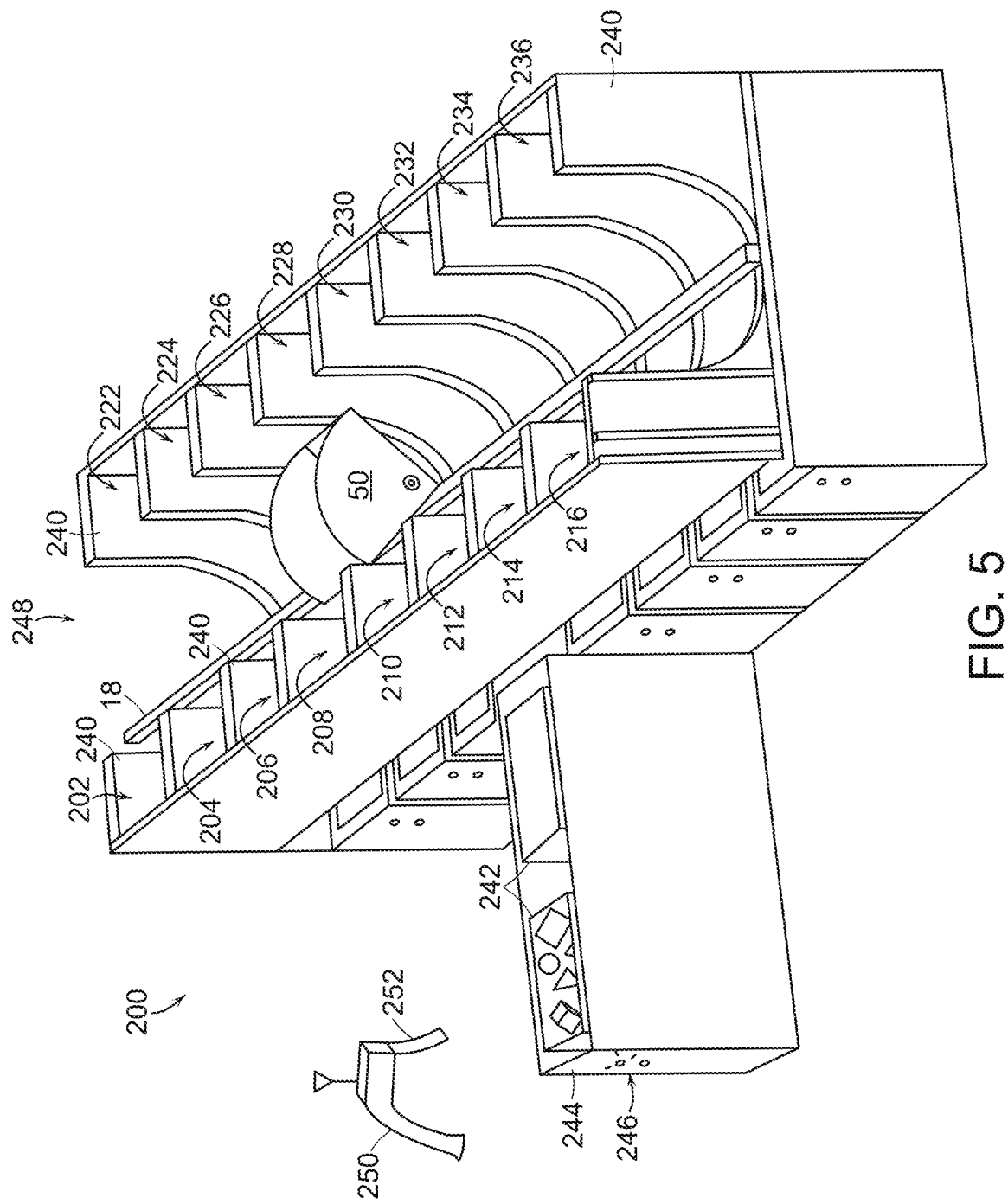
FIG. 5 shows an illustrative diagrammatic view of a sortation system in accordance with another embodiment of the invention.
Figure 6:
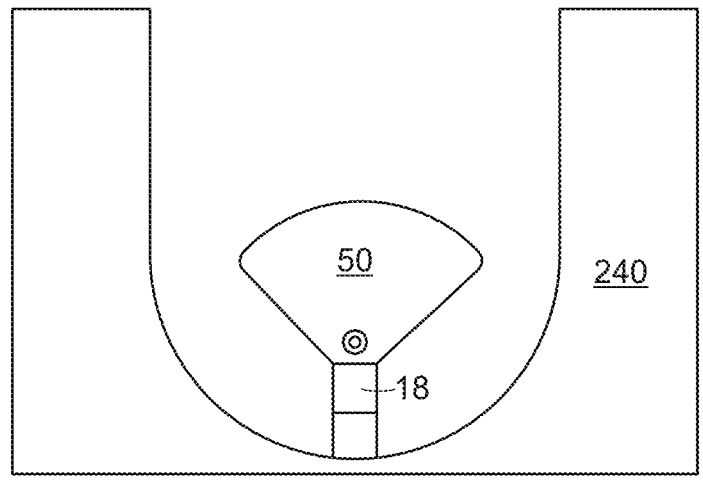
FIGS. 6 and 7 show illustrative diagrammatic views of a portion of the system of FIG. 5.
Figure 7:
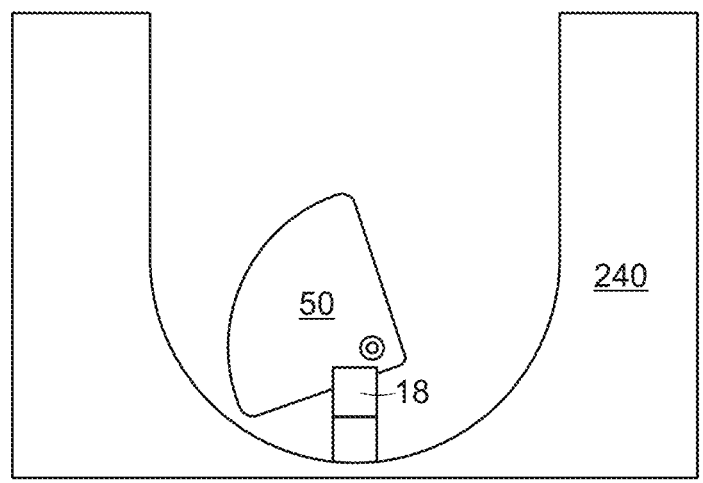
Figure 9:
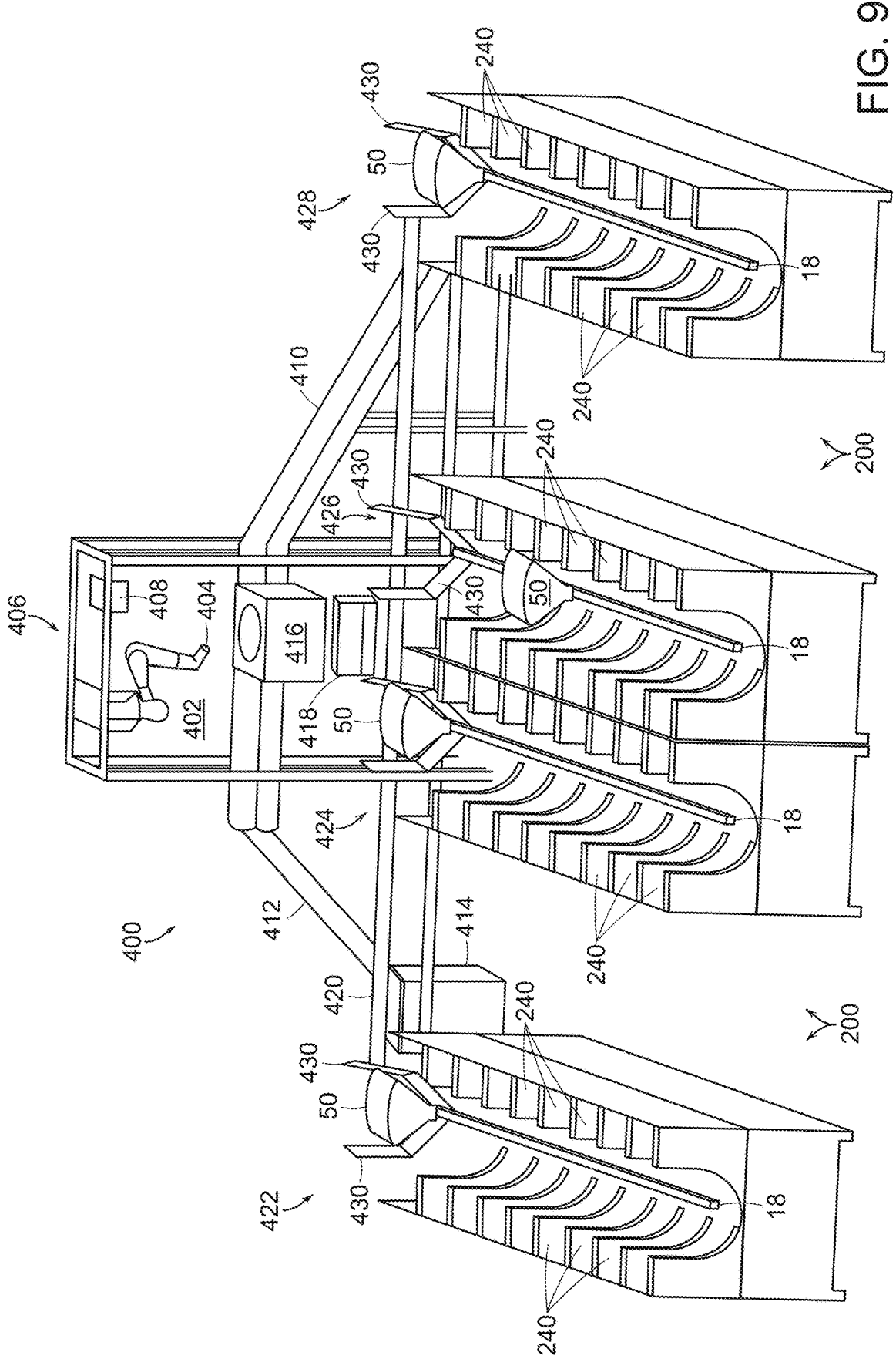
FIG. 9 shows an illustrative diagrammatic view of a sortation system in accordance with a further embodiment of the invention that includes four carriages.

FIG. 5 shows, for example, a shuttle system 200 that includes a carriage 50 on a track 18 that accesses locations 202, 204, 206, 208, 210, 212, 214, 216, 222, 224, 226, 228, 230, 232, 234 and 236. Each location may include chute walls 240 for guiding the objects, and bins 242 for receiving the objects. Generally, objects are serially loaded into the carriage 50 at a first end 248, and the carriage 50 shuttles the objects to the assigned bins. The bins 242 may be provided on drawers 244 that slide out from the system 200, wherein the bins for locations 212 and 232 are shown pulled out. Each drawer 244 may include lights 246 that become illuminated when the system identifies that a bin is ready for further processing. As shown in FIG. 9, the light associated with the bin at location 212 is shown lit because the bin has been identified as being full. A hand-held printer (or printer/scanner) 250 may be in wireless communication with the central controller 44, and may print out a label 252 specifically identifying the contents of the bin that is being emptied for further processing. In certain embodiments, for example, the bin may include a bag that is sealed and labeled by a label 252 when pulled from the drawer. As shown in FIGS. 6 and 7, when the carriage is tipped on the track 18, the carriage 18 does not enter into the area defined by the chute walls. This permits the carriage 18 to begin its travel back to the first end 248 as soon as the object is ejected from the carriage.

Figure 8:
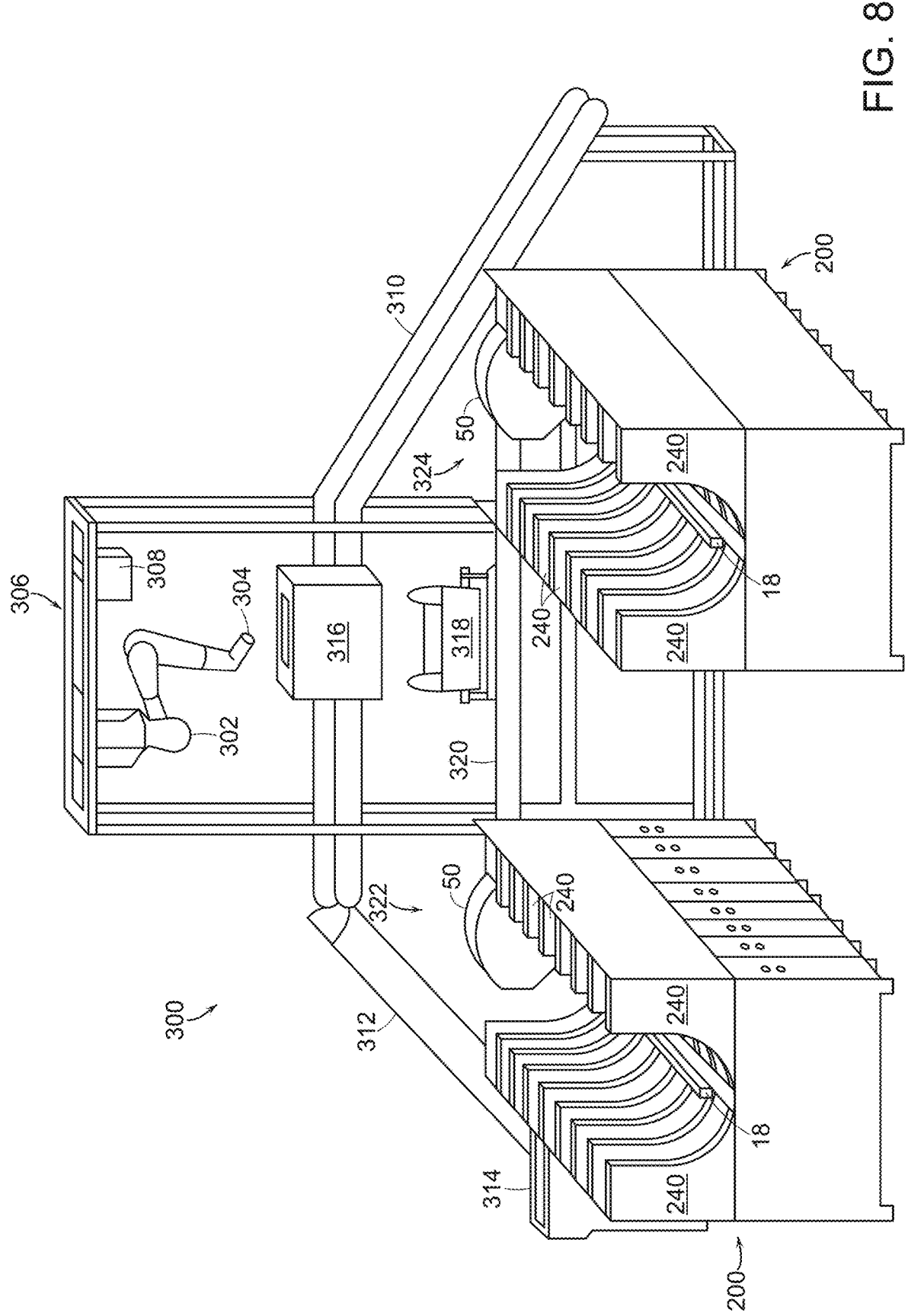
FIG. 8 shows an illustrative diagrammatic view of a sortation system in accordance with a further embodiment of the invention that includes two carriages.

FIG. 8 shows a shuttle sortation system 300 that includes two shuttle systems 200 of FIG. 5, each of which includes a carriage 50 on a track 18 that provides objects to bins 242. The system 300 also includes an articulated arm 302 with an end effector 304, an input area 306 in which objects are presented for sortation, an overhead camera 308 for identifying objects to be sorted, and a receiving conveyor 310 for receiving objects to be sorted from any of a human worker, another conveyor, or an input pan. The system also includes a non-sortable output chute 312 that leads to a non-sortable output bin 314 for providing objects that the system either could not identify or could not sort for any other reason (e.g., could not grasp or pick up).

In addition to the overhead camera 308, the system also includes a drop scanner 316 that includes an open top and open bottom, and a plurality of cameras positioned within the unit 316 that are aimed at the top, mid and lower central regions of the interior of the unit 316, as disclosed, for example, in U.S. Provisional Patent Application Ser. No. 62/269,640 filed Dec. 18, 2015 and U.S. patent application Ser. No. 15/228,692, filed Aug. 4, 2016, the disclosures of which are hereby incorporated by reference in their entireties. The plurality of cameras take images of an object when it is dropped by the end effector 304 through the unit 316. The unit 316 may also include lights within the unit 316, and one or more sensors (e.g., laser sensors) at the top of the unit 316 that detect when an object is dropped into the unit 316. The plurality of cameras are designed to collect a plurality of images of each object from multiple views (ideally all possible views) to aid in identifying or confirming the identity of the dropped object.

The dropped object then falls into a first carriage 318 that is provided on a track 320 on which the conveyor 318 may be moved automatically between a first sortation stage 322 and a second sortation stage 324 on either side of the area in which the object was dropped. The first carriage 318 is also provided with actuators that may selectively cause the carriage to tip on either side of the track 320 to dump its contents into either the carriage 50 at sortation stage 322 or sortation stage 324, similar to the operation of the carriage 50 discussed above with reference to FIGS. 1-7. The first sortation stage 322 includes a carriage 50 that may receive objects from the carriage 318, and which travels along a track between two rows of collection bins into which objects may be dumped along guide walls 240, and the second sortation stage 324 includes a carriage 50 that may receive objects from the carriage 318, and which travels along a track between two rows of collection bins into which objects may be dumped along guide walls 240.

The system of FIG. 8 shows a system with two shuttle sorters. When an object is picked from the infeed conveyor, it is dropped onto the first shuttle sorter 318. That shuttle sorter carries the object to one of two shuttle systems 200, drops the object in the carrier for that system, and then moves back to home. Each of the carriers for systems 200 may also include a carriage guide 430 (as shown in FIG. 9) that guides objects into a carriage 50 but does not move with the carriage. Due to the limited travel, this back and forth operation may be performed in the time it takes the articulated arm to pick another object (assuming the articulated arm is picking objects at approximately a human rate of throughput).

The shuttle sorter system therefore includes an object carriage on a motorized linear slide that travels above a double row of collection bins. The carriage is loaded with an object and then moves along the linear slide until it has reached the collection bin where the object belongs; it then uses rotational actuation to eject the object to one side or the other, where it falls into one of the two collection bins at that location. The carrier then returns to the home position to await another object.

In the concept as shown, each system 200 is limited to 8 collection bins long, for 16 total collection bins per wing. The length of collection bins traveled by the linear carriage should be balanced with other throughput factors in the system. Given achievable speeds for belt driven linear actuators, distances, and picking speed of the articulated arm, this length of 8 collection bins is a reasonable length that does not adversely limit system throughput (i.e., the articulated arm does not have to wait for a carriage to return to home before picking another object). At this 8×2 or 16 collection bin count, each system 200 has a divert cost far less per intelligent divert for currently fielded solutions, as discussed above.

Systems in the prior art also do not use back and forth style sortation because the shuttle can only handle one item at a time, and the shuttle needs to return to its home position after each sort. In this system, this concern is alleviated in three ways: 1) multiple systems 200 are used in parallel, 2) frequent destinations are assigned to collection bins closer to the shuttle's home position, thereby reducing the average cycle time of the shuttle, and 3) mapping of objects to collection bins is dynamic and under the control of the system as discussed above with reference to the system of FIGS. 1-7.

Systems of the invention are therefore, highly scalable. FIG. 9, for example, shows a system 400 that includes four shuttle systems 200 of FIG. 5, each of which includes a carriage 50 on a track 18 that provides objects to bins 242. The system 400 also includes an articulated arm 402 with an end effector 404, an input area 406 in which objects are presented for sortation, a primary camera 408 for identifying objects to be sorted, and a receiving conveyor 410 for receiving objects to be sorted from any of a human worker, another conveyor, or an input pan. The system also includes a non-sortable output chute 412 that leads to a non-sortable output bin 414 for providing objects that the system either could not identify or could not sort for any other reason (e.g., could not grasp or pick up).

Again, in addition to the overhead camera 408, the system also includes a drop scanner unit 416, which includes an open top and open bottom, and a plurality of cameras positioned within the unit 416 that are aimed at the top, mid and lower central regions of the interior of the unit 416, as discussed above with reference to drop scanner unit 316 of FIG. 8. The dropped object then falls into a carriage 418 that is provided on a track 420 on which the conveyor 418 may be moved automatically between a first sortation stage 422, a second sortation stage 424, a third sortation stage 426, and a fourth sortation stage 428. Again, the carriage 418 is also provided with actuators (e.g., electric or pneumatic) that may selectively cause the carriage to tip on either side of the track 420 to dump its contents into the carriage 50 at any of sortation stages 422, 424, 426 or 428, similar to the operation of the carriage 50 discussed above with reference to FIGS. 1-8.

The system 400 therefore includes 64 total collection bins. This system may be further scaled to add more collection bins. The first shuttle sorter (that transfers objects from the picking robot to the systems 200) may also be lengthened to accommodate 4 shuttle systems 200 before system throughput is adversely affected.

Figure 10:
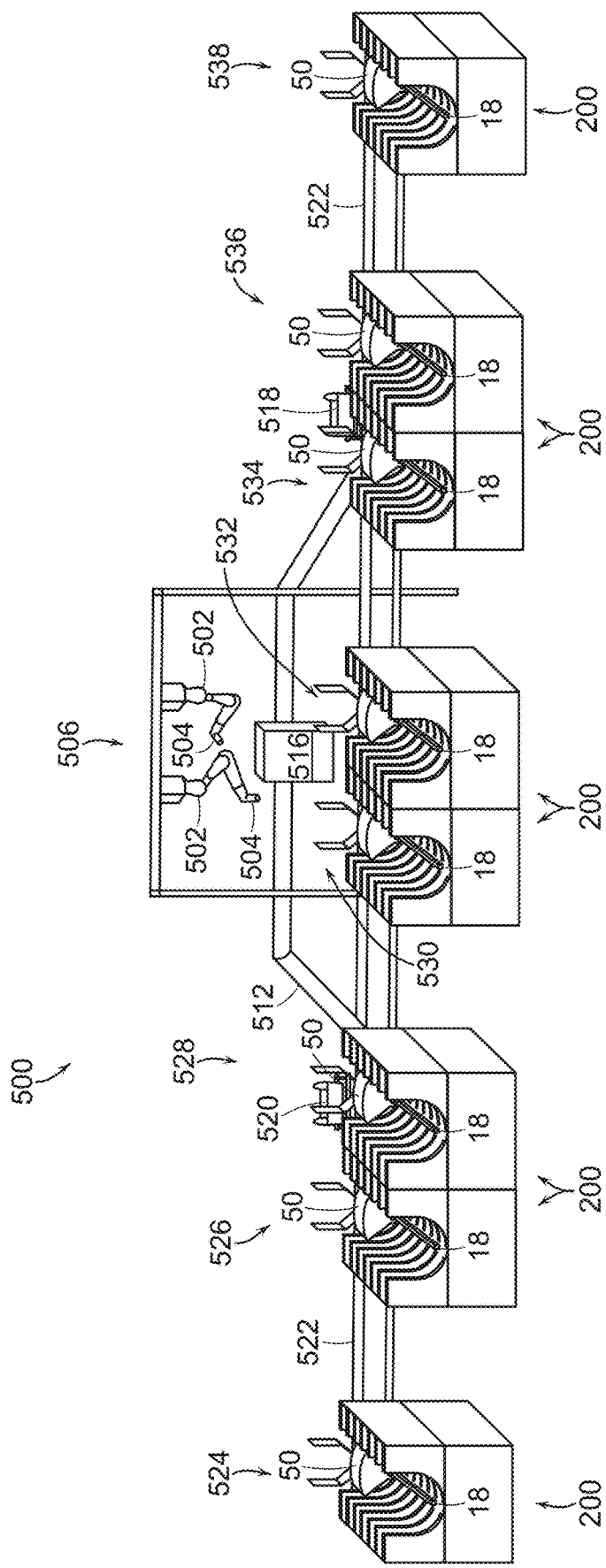
FIG. 10 shows an illustrative diagrammatic view of a sortation system in accordance with a further embodiment of the invention that includes eight carriages.

In particular, the system may be further expanded by again doubling the number of systems 200. This requires the addition of another shuttle sorter that takes the object from the picking robot and delivers it to one of the 4 systems 200. This keeps the shuttle sort[[ ]] back and forth travel time from adversely effecting overall system throughput. Such a system is shown in FIG. 10. FIG. 10 shows a system 500 that includes eight shuttle systems 200 of FIG. 9, each of which includes a carriage 50 on a track 18 that provides objects to bins 242. The system 500 also includes an articulated arm 502 with an end effector 504, an input area 506 in which objects are presented for sortation, and a receiving conveyor 410 for receiving objects to be sorted from any of a human worker, another conveyor, or an input pan. The system also includes a non-sortable output chute 512 that leads to a non-sortable output bin for providing objects that the system either could not identify or could not sort for any other reason (e.g., could not grasp or pick up).

Again, the system 500 also includes a drop scanner 516, which includes an open top and open bottom, and a plurality of cameras positioned within the scanner 516 that are aimed at the top, mid and lower central regions of the interior of the scanner 516, as discussed above with reference to drop scanner 316 of FIG. 10. The dropped object then falls into one of two carriages 518, 520 that are provided on a track 522 on which the carriages 518, 520 may be moved automatically between a first sortation stage 524, a second sortation stage 526, a third sortation stage 528, a fourth sortation stage 530, a fifth sortation stage 532, a sixth sortation stage 534, a seventh sortation stage 536 and an eighth sortation stage 538. Again, the carriages 518, 520 are also provided with pneumatic actuators that may selectively cause the carriage to tip on either side of the track 522 to dump its contents into the carriage 50 at any of sortation stages 524-538, similar to the operation of the carriage 50 discussed above with reference to FIGS. 1-9. The system 500 therefore includes 64 total collection bins.

In each of the systems 300, 400 and 500, the carriages 318, 418, 518, 520 are able to travel along its track in a direction far enough to reach both the input conveyor as well as the non-sortable output chute. This provides that the system may elect to send an object in the first carriage to either the input conveyor to be re-processed, or to the non-sortable output chute if the object is not sortable.

The system also provides, in each embodiment, dynamic collection bin allocation as discussed above. In typical human manned systems, collection bins are statically associated (to destinations, next stop facilities, customers, etc.) and don't change frequently; this is so that efficiency benefits, may be gained by humans learning the association and cubby locations. In the systems discussed above, no such constraints exist, since the system is placing all of the objects in collection bins, and it always has comprehensive knowledge of which objects are in the system, which are in each bin, etc. The systems also have knowledge of all historical sortation activity, meaning that historical trends can be used to make even smarter choices about collection bin allocation.

If, for example, the historical data suggests that two of the collection bins in this system get the most objects in each sort cycle, then the system will allocate one of these bins to the first system 200 (wing), and one to the second, thus ensuring that all the high volume bins are not on one wing creating a bottleneck. The system may also allocate bins close to the beginning of the wing, thereby ensuring minimum cycle times for the busiest collection bins. Further, if the system needs an empty bin, it can signal to a human operator to come and empty a given bin, allowing that bin to be used as soon as it is emptied. These strategies ensure that the cycle time of the shuttle sort wings does not impact overall system throughput.

Additionally, the system may also allocate and group objects so as to maximize any other arbitrary cost function. Such a sortation system is almost always a small part of a large system, usually extending across multiple facilities around the state, country, or world. As a part of such a large network, the performance of this system inevitably has impacts on costs elsewhere in the network. By understanding these impacts, the system presented here can allocate objects to collection bins in order to minimize cost impact elsewhere in the macro network.

In this system concept, additional articulated arms (robots) may also be added to each of the concepts to scale throughput for the system. By adding robots and shuttle sort wings, and tuning shuttle sorter speeds and robot picking/scanning speeds, a wide range of overall system throughputs and collection bin counts are possible using the same basic architecture.

For further scaling 8 wings fed by one pick/scan station may be a maximum for certain applications. To scale a maximum number of bins and a maximum throughput beyond this, multiple of these stations can be parallelized and fed by manual or automated means, just as manual sort cells are fed in concepts discussed in the prior art. This allows for continued linear scaling of throughput, as well as for greater numbers of collection bins, since the system can now dynamically allocate between all the bins in all the wings in all of the parallel cells.

Those skilled in the art will appreciate that numerous modifications and variations may be made to the above disclosed embodiments without departing from the spirit and scope of the present invention.

What is claimed is:

1. A method of processing objects, said method comprising:
    receiving a plurality of objects to be processed at an input area;
    grasping a selected object of the plurality of objects with an end-effector of a programmable motion device;
    moving the selected object with the end-effector of the programmable motion device to a load bed of a carriage at a loading location of a processing area, said load bed for receiving the selected object;
    driving the carriage at a carriage elevation on a track system in a first route to move from the loading location of the processing area to a selected destination location of a plurality of destination locations within the processing area, wherein the plurality of destination locations is provided below the track system;
    dropping the selected object from the carriage into a selected container at the selected destination location by tipping the carriage;
    driving the carriage in a second route that is different than the first route to move along the track system from the selected destination location back toward the loading location to receive a next object from the programmable motion device; and
    removing the selected container from the selected destination location, said selected container being provided on a pull-out drawer.

2. The method of claim 1, wherein receiving the plurality of objects includes receiving the plurality of objects on an input conveyor.

3. The method of claim 1, wherein the end-effector includes a vacuum cup for grasping the selected object.

4. The method of claim 3, wherein the selected object is dropped from the vacuum cup into the load bed of the carriage.

5. The method of claim 1, wherein the plurality of destination locations is provided in an array of destination locations arranged underneath the track system.

6. The method of claim 1, wherein the pull-out drawer includes at least one further container associated with a further destination location of the plurality of destination locations.

7. The method of claim 1, wherein the carriage changes from moving in the first route to moving in the second route after the selected object is dropped into the selected destination location.

8. A method of processing objects, said method comprising:
    receiving a plurality of objects to be processed at an input area;
    grasping a first selected object of the plurality of objects with an end-effector of a programmable motion device;
    moving the selected first object with the end-effector of the programmable motion device to a load bed of a carriage at a loading location of a processing area;
    driving the carriage at a carriage elevation on a track system in a first route to move from the loading location to a first selected destination location of a plurality of destination locations within the processing area, wherein the plurality of destination locations is provided below the track system;
    dropping the first selected object from the carriage into a first selected container at the first selected destination location by tipping the carriage;
    driving the carriage in a second route that is different than the first route to move along the track system from the first selected destination location back toward the loading location;
    grasping a second selected object of the plurality of objects at the input area with the end- effector of the programmable motion device;
    moving the second selected object with the end-effector to the load bed of the carriage at the loading location of the processing area;
    driving the carriage at the carriage elevation on the track system in a third route to move from the loading location to a second selected destination location of the plurality of destination locations within the processing area;
    dropping the second selected object from the carriage into a second selected container at the second selected destination location by tipping the carriage; and
    driving the carriage in a fourth route that is different than the third route to move along the track system from the second selected destination location back toward the loading location.

9. The method of claim 8, wherein receiving the plurality of objects includes receiving the plurality of objects on an input conveyor.

10. The method of claim 8, wherein the end-effector includes a vacuum cup for grasping the selected object.

11. The method of claim 10, wherein the selected object is dropped from the vacuum cup into the load bed of the carriage.

12. The method of claim 8, wherein the plurality of destination locations is provided in an array of destination locations arranged underneath the track system.

13. The method of claim 8, wherein the method further includes removing the first selected container from the first selected destination location, said first selected container being provided on a pull-out drawer.

14. The method of claim 13, wherein the pull-out drawer includes at least one further container associated with a further destination location of the plurality of destination locations.

15. The method of claim 1, wherein the carriage changes from moving in the first route to moving in the second route after the selected object is dropped into the first selected destination location.

16. An object processing system comprising:

a programmable motion device for moving a first object of a plurality of objects and for moving the first object to a carriage with a load bed for receiving the first object thereon from the programmable motion device at a loading location, said carriage being movably mounted at a carriage elevation on a track system for movement of the carriage at the carriage elevation;

a plurality of destination locations, each destination location including a destination container with an open top, said plurality of destination locations being provided in an array of destination locations arranged underneath the track system at a destination location elevation that is lower than the carriage elevation; and an actuation system for causing the carriage to discharge the selected object from the load bed and drop the selected object into a selected destination container of a selected destination location of the plurality of destination locations, wherein the carriage is driven in a first route to move along the track system from the loading location towards the selected destination location and is driven in a second route that is different than the first route to move along the track system towards the loading location from the selected destination location to receive a next selected object from the programmable motion device at the loading location.

17. The object processing system of claim 16, wherein the object processing system further includes an input conveyor on which the plurality of objects are provided to the programmable motion device.

18. The object processing system of claim 16, wherein the programmable motion device includes an end-effector with a vacuum cup for grasping the selected object.

19. The object processing system of claim 18, wherein the selected object may be dropped from the vacuum cup into the load bed of the carriage.

20. The object processing system of claim 16, wherein the actuation system is actuatable to drop the selected object from the load bed into the selected destination container.

21. The object processing system of claim 16, wherein the selected destination container is provided on a pull-out drawer.

22. The object processing system of claim 21, wherein the pull-out drawer includes at least one further destination container associated with a further destination location of the plurality of destination locations.

* * * * *